Figure 1:
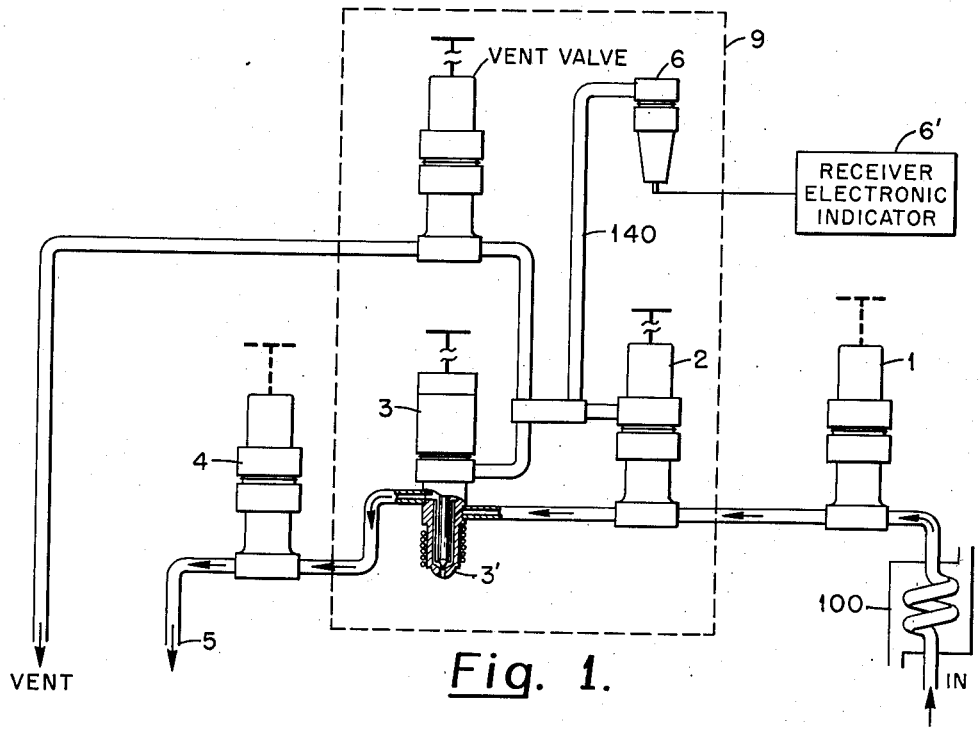

Jan. 17, 1961   B. A. HANNAFORD ET AL   2,968,183
SAMPLING SYSTEM
Filed Oct. 30, 1956   5 Sheets-Sheet 1

INVENTORS
Bruce A. Hannaford
BY  Richard Rosenberg
Charles L. Segaser
Clegia L. Terry
ATTORNEY INVENTORS
Bruce A. Hannaford
BY Richard Rosenberg
Charles L. Segaser
Clegia L. Terry
ATTORNEY

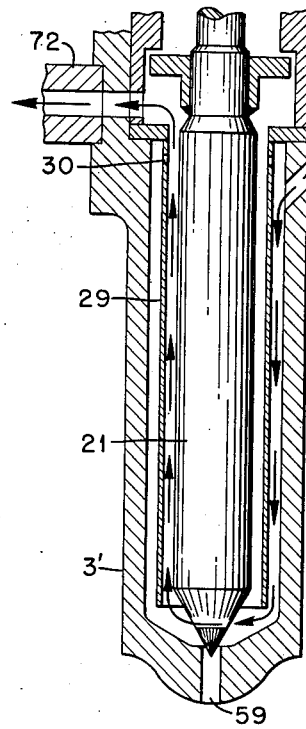
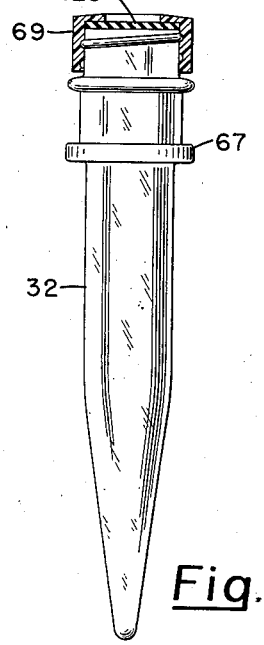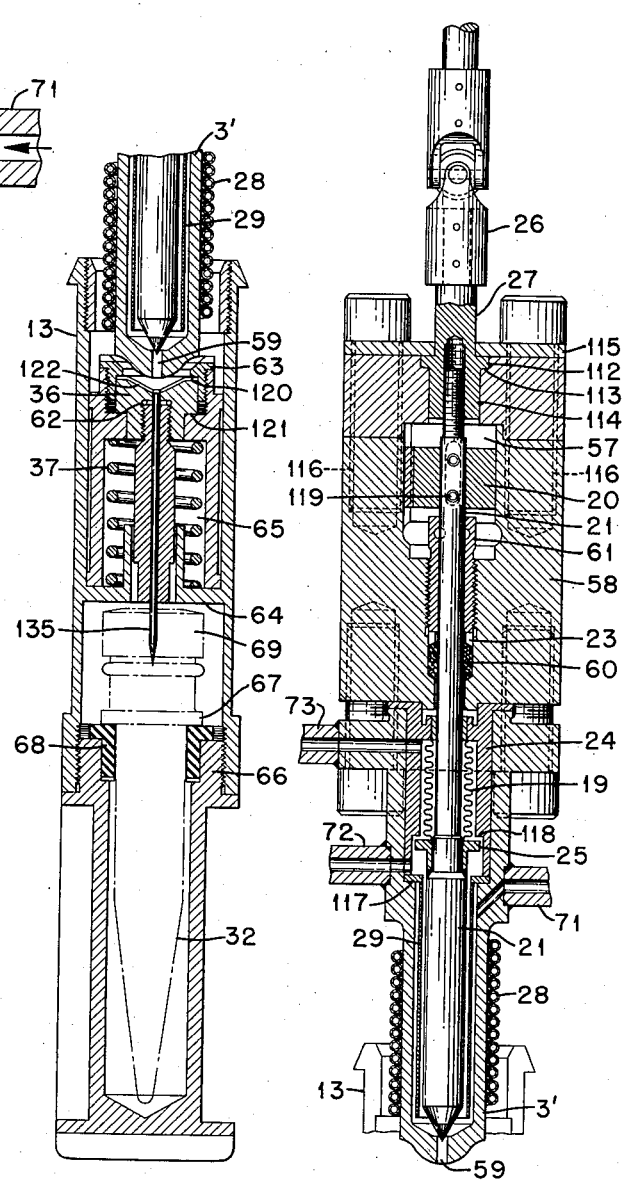
Fig. 4.
Fig. 12.
Fig. 3A.
Fig. 3.
Jan. 17, 1961   B. A. HANNAFORD ET AL   2,968,183
SAMPLING SYSTEM
Filed Oct. 30, 1956   5 Sheets-Sheet 3
INVENTORS
Bruce A. Hannaford
Richard Rosenberg
Charles L. Segaser
Clegia L. Terry
BY
ATTORNEY

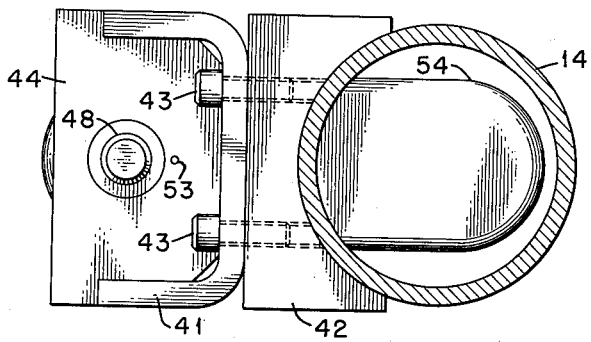
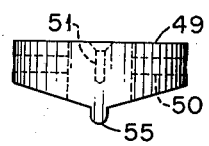
Fig. 9.
Fig. 11.
Fig. 10.
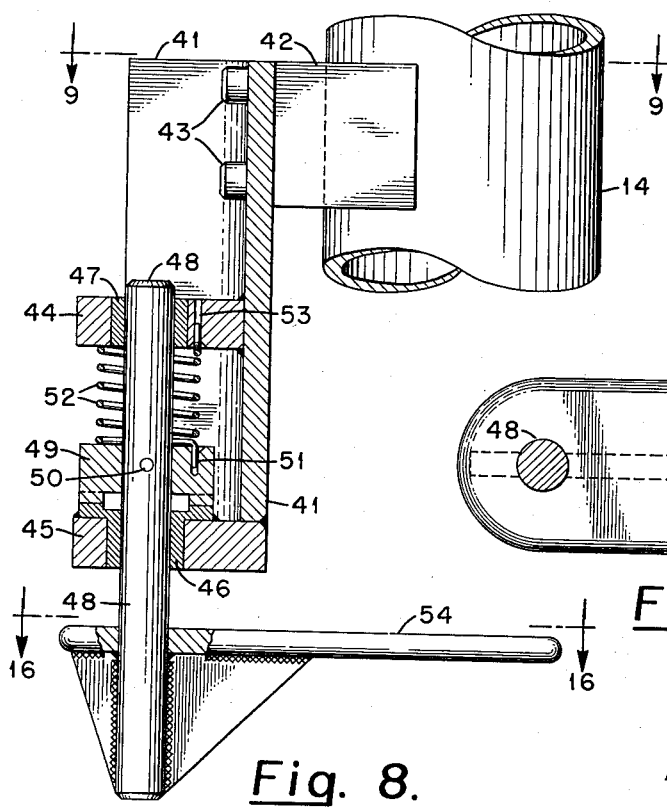
Fig. 8.
Fig. 16.
INVENTORS
Bruce A. Hannaford
Richard Rosenberg
Charles L. Segaser
Clegia L. Terry
BY
ATTORNEY Jan. 17, 1961 B. A. HANNAFORD ET AL 2,968,183
SAMPLING SYSTEM
Filed Oct. 30, 1956 5 Sheets-Sheet 5

INVENTORS.
Bruce A. Hannaford
BY Richard Rosenberg
Charles L. Segaser
Clegia L. Terry
ATTORNEY United States Patent Office 2,968,183
Patented Jan. 17, 1961

2,968,183

SAMPLING SYSTEM

Bruce A. Hannaford, Oak Ridge, Tenn., Richard Rosenberg, Pittsburgh, Pa., and Charles L. Segaser and Clegia L. Terry, Oak Ridge, Tenn., assignors to the United States of America as represented by the United States Atomic Energy Commission Filed Oct. 30, 1956, Ser. No. 619,369

4 Claims. (Cl. 73—421)

This invention relates to a system for obtaining representative samples from relatively large bodies of radioactive or other liquids, and more particularly to a sampling system for obtaining samples from a reactor or other source where the liquid is maintained at high temperatures and under pressure, and where such liquid is inherently dangerous to handle.

The preferred embodiment of this invention relates generally to liquid sampling systems and has particular relation to apparatus and procedures for obtaining representative samples from relatively large bodies of radioactive liquids contained at pressures of the order of 2000 pounds per square inch, and at temperatures of the order of 300° centigrade.

In performing certain chemical analysis procedures, including the examination of nuclear reactor fuel or liquids contained in juxtaposition to an operating reactors core, such as the blanket of thorium oxide slurry which is exposed within the shield of a homogeneous reactor to the action of neutrons from a chain reaction, the most suitable method is by periodic, direct examination of a representative sample recently removed from the operating nuclear reactor. Conventional sampling methods are unsatisfactory, chiefly because of the risk of serious injury to personnel which accompanies exposure to the high intensity radiations emanating from the main body of the liquid of the reactor and the extracted sample. This risk is particularly apparent when the sample must be obtained from an area under high pressure and elevated temperature. Conventional sampling methods, even when provided with safeguards for protection against radiation, are insufficient to withstand possible danger of liquid release in the form of spray and otherwise under the action of the high pressure and elevated temperature.

A principal object of applicants' improved system is, therefore, to provide a sampling system, particularly adapted for use in connection with processes involving large bodies of radioactive liquids at elevated temperatures and under high pressures, which will make available representative samples of a predetermined quantity of the body of liquid, as such samples may be required, and which will make possible the obtaining and handling of such samples without risk of injury to operating personnel.

Another object of applicants' invention is to provide a sampling system in accordance with the above stated object which is easily and remotely operable, substantially fool proof so that the risk of mechanical failure is minimized, and is comprised of easily replaceable and removable components to facilitate system cleaning and to permit repairs resulting from mechanical failure.

Other objects and advantages of our invention, the various novel structural arrangement combinations used therein, and details of the system will be made apparent by reference to the accompanying drawings and the following description of a preferred embodiment of the invention, which embodiment is particularly adapted for operation with a reactor of the homogeneous type.

Figures 5, 6:
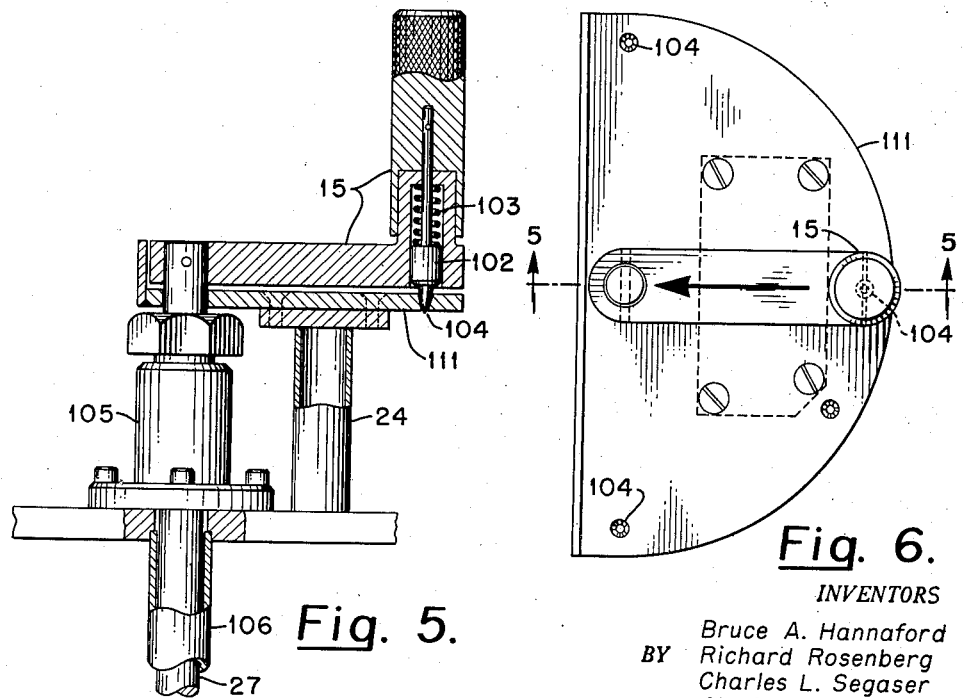
Figures 2, 7:
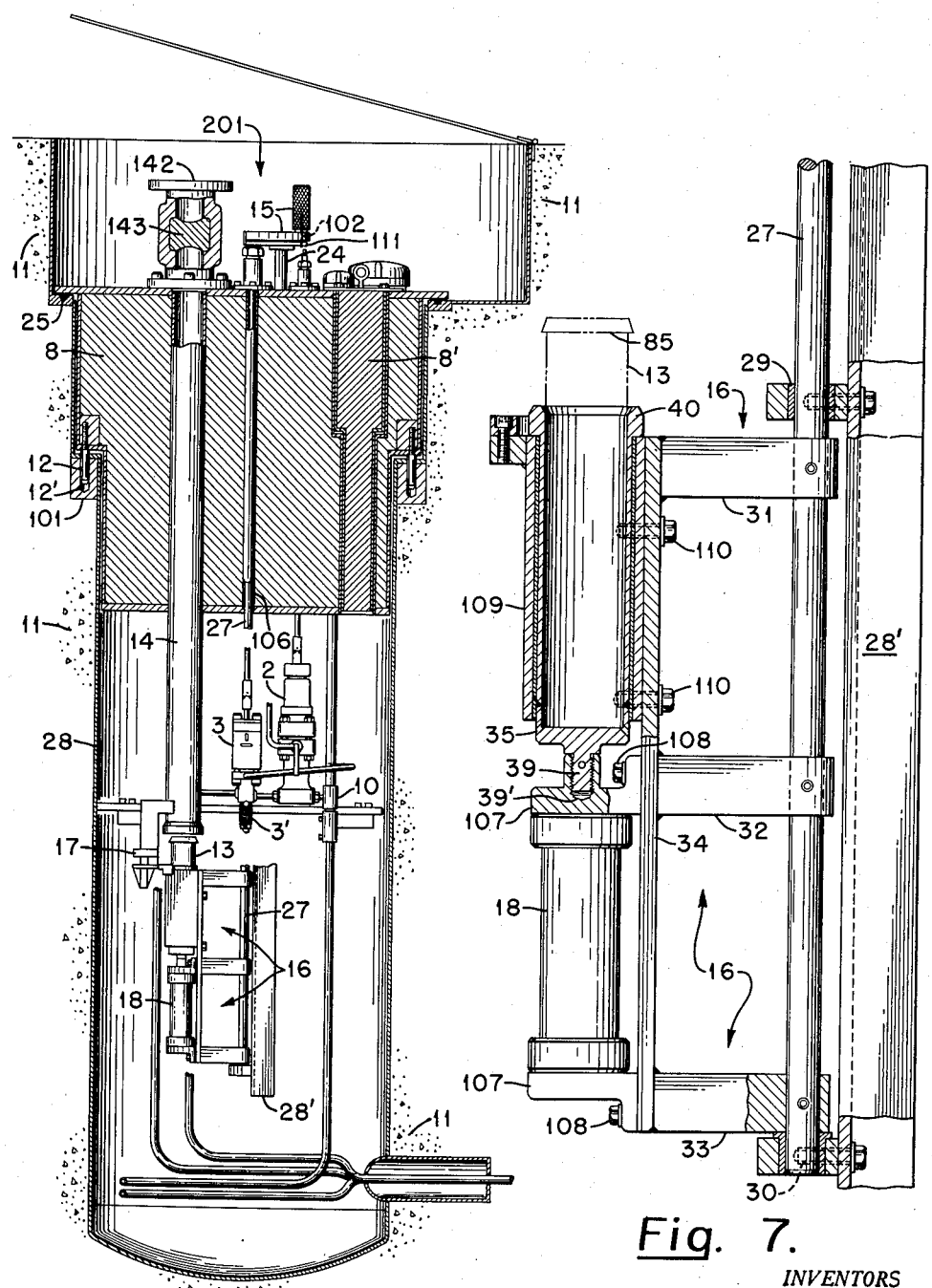
Figure 13:
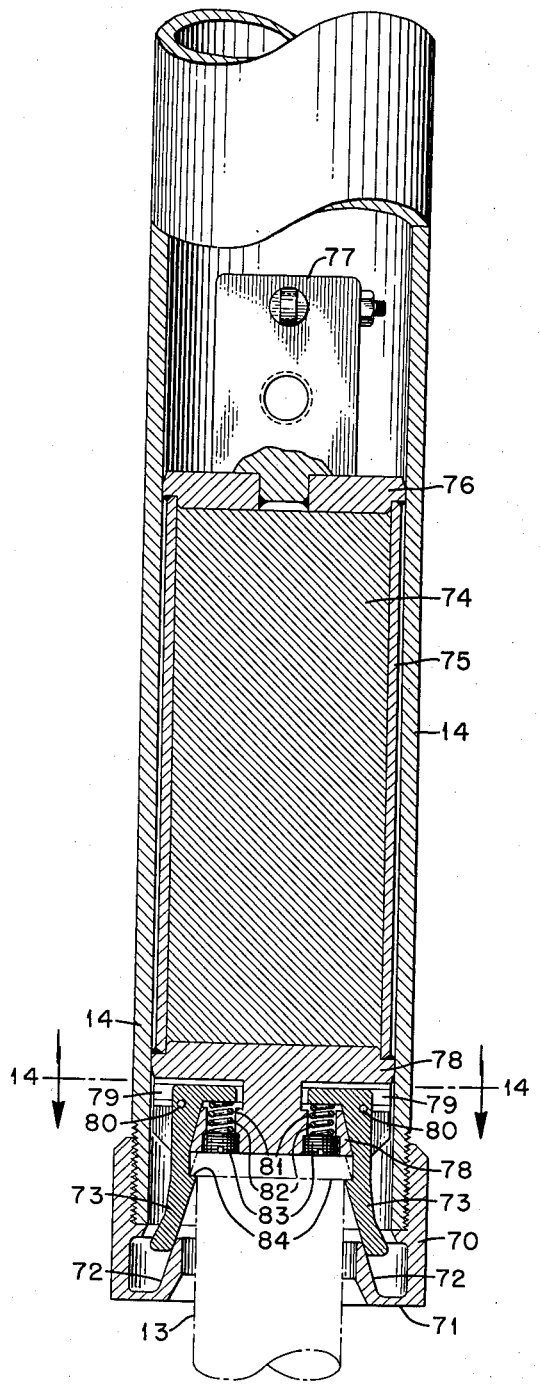
Figure 14:
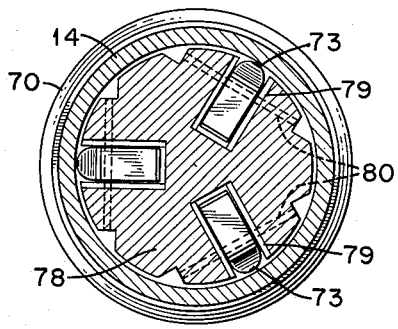
Figure 15:
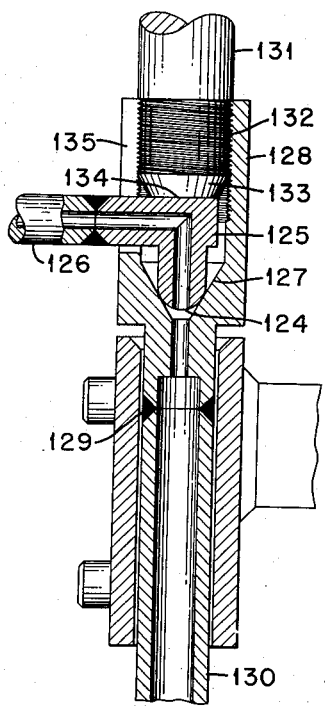

In the drawings, Figure 1 is a schematic of our improved sampling system indicating the flow paths of fluids therethrough. Figure 2 is a sectional elevation of a sampling station including handling equipment for our improved system. Figures 3 and 3A are sectional elevations of a flask holder and isolation chamber. Figure 4 is a sectional elevation of the body and lower portion of the stem of the isolation chamber. Figure 5 is an elevation, partly in section, of the crank and mounting for manipulating the flask holder into position. Figure 6 is a plan view of the crank and indexing plate of the flask holder manipulating mechanism. Figure 7 is an elevation, partly in section, of the transfer mechanism. Figure 8 is an elevation, partly in section, of the mechanical safety guard for the transfer frame or arm. Figure 9 is a plan view of the mounting for the mechanical safety guard of Figure 8. Figure 10 is a detail of the bearing and cam of the safety guard. Figure 11 is a detail of the rider for the safety guard. Figure 12 is an elevation, partly in section, of a suitable sample flask. Figure 13 is a sectional elevation of the lower portion of the loading pipe with a lifting tool in place to remove the sample flask holder. Figure 14 is a section taken along the line 14—14 of Figure 13. Figure 15 is a sectional elevation of a remotely operated connector. Figure 16 is a plan view of the cover plate of the safety guard for the lower end of the loading tube.

One form of homogeneous reactor utilizes uranyl sulfate solution, commonly known in the art as "soup" as the reactor fuel, while heavy water may be employed as the reflecting medium. Another embodiment may take the form of a breeder type of reactor with the heavy water reflector being replaced by a blanket of thorium oxide slurry surrounding the core. The pressure for both the fuel and the blanket systems will be of the order of 2000 p.s.i. and the temperature of the order of 300° C. This embodiment is intended to obtain by remote operation a 5 ml. sample from the system in accordance with the aforementioned objectives.

Figure 1 illustrates the method of reducing the line pressure by passing the "soup" through a throttling valve 1. Prior to the introduction of the "soup" to the sampling system, however, the "soup" temperature is lowered by means of a conventional water jacketed heat exchanger 100. The throttling valve 1 experiences the full 2000 p.s.i. pressure drop across its inlet and outlet ports. It is of conventional construction, such as the Fulton Sylphon 3000 series bellows sealed valve type, and is comprised of an integral seat, stellite tipped stem, and a three ply bellows used as a positive seal for the valve stem. While a valve having the foregoing components is desirable and satisfactory for this purpose, it will be understood that any other suitable throttling valve, which would meet operational requirements, could be utilized in the system. In this particular embodiment it was further found satisfactory, where possible, to have the bellows of all valves in the system reinforced by an asbestos packing gland.

The "soup" after being subjected to the action of the throttling valve 1 and the heat exchanger 100 is now in a thermodynamic state where it can be handled by more conventional means. Again referring to Figure 1, it can be seen how a sample is obtained. The "soup," at reduced temperature and pressure, passes through a shut-off valve 2 and into an isolation chamber 3. After a given period of time the throttling valve 1 and shut-off valve 2 are closed, and the "soup" is allowed to drain into a discharge header through an automatically operated valve 4 and into a dump tank (not shown) through line 5. All the liquid, however, does not drain into the dump tank through line 5, as the isolation chamber entraps a specific volume, i.e., 5 ml., in its lower extremities. This volume of fluid is then available for transfer to a sample receiver. The apparatus and steps involved in the transfer will be described more in detail hereinafter.

In this arrangement, it was important that a minimum number of valves be used in order to reduce maintenance. In addition, space is limited and is at a premium; therefore, hand operated valves are tolerated at the sampler and air operated valves are employed at critical points. Valves 1 and 4 are of critical importance, and, therefore, one or both may be located externally of the sampling facility and are indirect manually remotely controlled. Valve 1 may be manually closed in response to information received in response to the action of an electro-pneumatic control which may take the form of a commercially available D.P. cell 6 which is connected to communicate through line 140 with and be responsive to excessive pressure build-up in the isolation chamber 3, and to drive indicator 6: D.P. cell 6 in this embodiment acts as a pressure cell with a 10 lb. range and a 2000 lb. over range. Valve 4 is remote operated valve, controlled in a manner similar to that of valve 1.

After a sample has been deposited in the isolation chamber 3, the next step is to remove it for analysis. Figure 2 illustrates a typical sampling station where a tank 28 encloses shut-off valve 2 for feeding liquid to isolation chamber 3, a sample flask holder 13 for holding a flask, an air cylinder 18 for raising the flask, a pivoted transfer arm or frame 16, actuated by an externally positioned handle 15, a mechanical safety guard 17, a plug 8 for the tank, and a loading pipe 14 extending down through the plug for the passage and removal of the sample flask holder. To secure a sample from the isolation chamber, the sample holder flask 13 is carried by transfer arm or frame 16 into alinement with the isolation chamber 3 upon rotation of handle 15 and a sample is released from the isolation chamber into an evacuated flask of the flask holder 13. The transfer arm 16 is then swung about its pivot by handle 15 until the flask holder 13 is brought into alinement with loading pipe 14, and is yieldingly held in this position by an indexing pin 102 whose point registers with an opening 104 in the indexing plate 111. The flask holder 13 is then raised into the lower end of loading pipe 14 by operation of the air cylinder 18. A lifting tool is then passed down from the top of the plug 8 through the loading pipe until it is brought into interlocking engagement with the flask holder 13. Thereafter, it is raised through the loading pipe and removed from the enclosure 201 for analysis.

Now referring more in detail to Figure 2, a housing or tank for enclosing the necessary handling equipment and the elements of the sampler is indicated at 28. The sampling station housing or tank 28 may be of a convenient configuration and size to contain the elements of the sampling system, and in this embodiment, may be a cylinder two feet in diameter and eight feet long. The tank is preferably embedded in the concrete floor 11 of the reactor building with a shield plug 8 extending into and closing its upper extremity. The entire sampling system 9, of Figure 1, may be disconnected from the incoming and outgoing piping in case the need for maintenance should arise. This is possible because all of the handling equipment, including the isolation chamber 3, is mounted on or suspended from the shielding plug 8, by appropriate supports and all piping connections to and from the sampling facility are made through connectors 10 which are engaged and released by remote means, as explained more fully in connection with the description of Figure 15.

The shielding plug 8 in the present embodiment comprises an outer casing filled with lead shot and water to provide biological shielding to protect operating personnel from harmful radiation. It is flanged along its intermediate portion and has a plurality of centering pins 12 projecting downwardly from the flange to seat in sockets 12' in flange ring 101 carried by the tank 28. The upper extremity of the plug also carries a circumferential flange for cooperation with a sealing gasket 25 seated in an annular recess in the upper rim or flange of the tank 28. To prevent possible outleakage of radioactive gases, the shield plug 8 must seat against the gasket surface and the tank opening. In order to prevent the incoming and outgoing pipes to which the sampling system components are attached, from interfering with the seating, each pipe within the housing may be coiled at least one quarter of a turn. This provides enough spring action or resiliency to permit the male side of the pipe connectors 10 to seat in the female parts and then let the shield plug 8 come to rest upon the finishing floor section of the reactor building. Proper alinement of parts is accomplished by the guide pins 12, mentioned above, when they seat in the sockets 12' in the tank ring 101. The shield plug 8 may also have a sealed opening 8' for placement of a periscope or other device for visual observation.

Mounted on the upper extremity of the shield plug and extending down through it to an intermediate portion of the tank is the loading pipe 14. The upper extremity of the loading pipe 14 terminates in a shield plug valve 142 having a rotatable inner element 143 of shielding material to open and close the passage through pipe 14 in the manner of a stop cock. Also mounted on the upper extremity of the plug is a crank 15. This crank may ride over an indexing plate 111 mounted on a support 24 carried by the shield plug 8. The handle of crank 15 carries an indexing pin or plunger 102 urged downwardly by compression spring 103 to yieldingly seat in indexing openings 104 in the plate to indicate the location of the flask holder 13 carried by the transfer arm or frame 16 as indicated in Figures 5 and 6. The crank 15 is mounted on a shaft 27 which extends down through a packing box 105 on the plug 8 and serves to mount the transfer arm 16. The shaft 27 is encased in a tubular casing 106 suspended from the plug. The shaft 27 may be supported in spaced bearings in a support 28' which is suspended from the lower extremity of the plug 8. In the vicinity of frame or arm 16 the shaft may be journaled in bearings 29, 30 which are mounted upon the support 28'. The frame or arm 16 is shown more particularly in Figure 7, and is comprised of a series of spaced horizontally extending members 31, 32 and 33. These members are secured at one end to the shaft 27 and are joined at the other end by a brace member 34 that bridges them. Mounted on the lower portion of the brace member 34 by brackets 107 and bolts 108 is the air cylinder 18, and above the air cylinder 18 is a container receptacle 109 bolted at 110 or otherwise secured to brace 34 for removably supporting container 35. The receptacle 109 is adapted to receive the container 35 which is slidable therein. Container 35 has a flange or lip 40 at its upper extremity which overhangs and rests upon the upper edge of the receptacle 109. The lower end of the container 35 is joined to the piston rod of the air cylinder by a screw threaded shank 39' which seats in a threaded socket 39 in the upper extremity of the cylinder rod. The container 35 is adapted to receive the flask holder 13. This flask holder 13 is removable from the container 35. From the foregoing, it is apparent that when the shaft 27 is rotated by the crank 15 the transfer arm or frame 16 comprised of members 31, 32, 33 is swung about a vertical axis and may be moved from alinement with the isolation chamber 3 to alinement with the loading pipe 14.

The mechanical safety guard shown in Figure 8 and generally designated 17 in Figure 2 comprises a frame 41 mounted upon the lower extremity of the loading pipe 14 by means of a plurality of studs 43 which thread into sockets in block 43 mounted on the lower extremity of the loading pipe 14 as indicated in Figure 9. Block 42 conforms to the outer surface and is rigidly attached to the loading pipe 14 by welding or otherwise. The frame 41 is of elongated channel configuration with blocks 44 and 45 serving to mount bearings 46 and 47 which receive pivot member 48. The upper surface of bearing 46 is formed in the shape of a cam as indicated in Figure 10 and the mating rider 49 is adapted to ride over the cam surface of bearing 46 in the rotation of the shaft 48. Rider member 49 is secured to the pivot member 48 by a pin 50 and has a recess 51 for the reception of a downturned end of a compression and torsion spring 52. The upper end of the spring 52 is anchored in a socket 53 in the block 44. On the lower surface of rider 49 are lugs 55, as shown in Figure 11, for cooperation with the cam face of bearing 46 to ride over it. The lower end of the pivot member 48 projects downwardly through the channel member 41 and has a horizontally extending plate 54 rigidly mounted thereon. This plate preferably takes the configuration shown in Figure 16, and is adapted to cover the lower end of loading tube 14 when swung into position thereunder.

It will be apparent that as the frame 16 and flask holder 13 are swung towards alinement with the loading pipe 14, they will engage the horizontal plate 54 of the safety guard 17. This causes the pivot member 48 to yieldingly rotate, compressing the torsion spring 52, and moving the plate 54 out of alinement with the lower end of loading tube 14, leaving it open for removal of the sample holder 13 from the tank. Alinement with the lower end of the loading tube 14 is indicated when the plunger 102 falls into the desired index opening 104 in plate 111 as the crank 15 sweeps over the indexing opening. At this point the plug valve 142 is opened by rotating inner element 143 into registration with the passage in tube 14 and the lifting tool may be lowered through the loading tube 14 to engage the upper extremity of the flask holder 13. When the lifting rod has become engaged with the flask holder 13 and is locked to it, the sample may be removed by lifting the sample rod up through the loading pipe into a protective carrier.

When a further sample is desired, the flask holder is then lowered through the loading pipe 14 and is positioned in the container 35 and released. The handle 15 is then rotated until the flask holder 13 in transfer arm or frame 16 is brought into alinement with the isolation chamber 3. Upon movement of transfer arm 16 from its position under loading tube 14, plate 54 is released to swing back under the lower end of tube 14 under the action of torsion spring 52 which rotates rider 49 over cam 46. When plate 54 completes its swing, it again covers the lower end of loading tube 14 and precludes the insertion of a further flask holder therethrough until the transfer arm 16 and its container 35 is again in alinement with the end of the loading tube.

Alinement of the flask holder 13 with the isolation chamber 3 is accomplished when the indexing pin 102 seats in the selected opening 104 in plate 111 as the crank 15 moves over it. At that point the air cylinder 18 is operated to raise the container 35 in the sleeve 13. This forces the sample flask holder 13 up against the isolaton chamber 3, and this in turn causes a needle 35 to puncture a diaphragm in the sample flask holder 13. A trapped volume of solution in the isolation chamber 3 can now be transferred to the sample flask 32. After this is done, the sample flask holder 13 is returned to its original position in alinement with the loading pipe 14 in the manner previously described, and may be withdrawn up into a carrier for transportation to an analytical facility.

The isolation chamber 3 is shown in Figure 3 and a detail of the body is indicated in Figure 4. In this embodiment the chamber is intended to withstand 2000 p.s.i. in the event of a failure of an upstream valve; however, normal operating pressure is atmospheric.

The isolation chamber 3 is formed by the walls of a hollow sectional housing 58 which is adapted to house an elongated, longitudinally movable stem 21. A stem 21 is secured by pins 119 adjacent its upper end to the guide block 20 that reciprocates in and rides on the walls of counter bore 57 and extends down through the bellows 19 into the body 3' or lower portion of the isolation chamber. The lower end of the stem is enlarged and its extremity tapers to a point. It is adapted to close an opening 59 in the lower end of the body 3' in the manner of a valve. The upper end of the stem 21 is reduced and threaded for engagement and coaction with a socket in an adaptor 27. The adaptor 27 has a peripheral flange 112 adjacent its lower extremity and rides on shoulder 113 of bore 114. A cap 115 closes the upper end of bore 114 and is retained on sectional housing 58 by studs 116 that thread into the body. A packing gland 23 is provided in an intermediate portion of the sectional housing 58 and includes the packing element 60 and a threaded packing gland nut 61 which surrounds the stem 21. The upper end of the adaptor 27 is joined through a universal joint 26 to an actuating mechanism for raising and lowering the stem 21 to release liquid contained in the body 3'. On the exterior of the body 3' is wound a coil of flexible tubing for controlling the temperature of the content of the body. An inner sleeve member 29 is suspended from upper flange portion 117, surrounds and is spaced from the stem 21 and from the walls of body 3' and serves to direct the flow of liquid in the space between the stem 21 and the walls of the body 3'. Surrounding the stem 21 and secured thereto by welding or otherwise, adjacent the enlarged lower portion thereof, is a flanged collar 25 which serves as a stop to limit the upward movement of the stem by engagement with shoulders 118 of section 24 of the housing 58. Liquid is introduced to the isolation chamber through port 71 and is removed through port 72.

Mechanical operation of the isolation chamber 3 is effected from a point externally of the tank shielding. When the chamber of body 3' is closed by the lower end of the stem 21 and it is desired to empty or drain an entrapped volume or sample of liquid, the universal joint 26 attached to the upper extremity of the stem through the adaptor 27 is rotated by conventional means so that the adaptor is swiveled in the sectional housing 58 and is threaded on to the upper reduced end of the stem 21. The rotation of the adaptor 27 is translated into vertical movement of the stem 21 as its upper end is threaded into the adaptor. This is accomplished by preventing rotation of the stem 21 through the action of the guide block 20 which is secured thereto by pins 119 and is restrained from rotation in the bore 57 by the walls thereof and the rectangular cross sectional configuration of block 20. The rising of the valve stem 21 removes the lower tapered end from the opening 59 in the body portion 3' and permits liquid contained in the annular spaces between the stem 21 and the inner walls of the body 3' to drain through the exit opening 59. Upward movement of the stem 21 is limited by the engagement of the collar 25 with the shoulder 118 of the sectional housing 58.

The flash holder 13 is comprised of a spring loaded hypodermic type needle assembly located in the body of the holder. The needle assembly includes a hollow or hypodermic type of needle 135 which terminates at its upper end in an annular flange 62 which seats in a bore in a shouldered fitting 36 and is held in place by a gland nut type of hollow fitting 38 that receives the body of the needle 135 and seats in and coacts with a threaded socket in the shouldered fitting 36. The shouldered fitting is mounted in cylindrical plunger 39 mounted in the tubular body of the flask holder 13. The fitting 36 and plunger 39 are maintained in assembled relation by a bushing 63 which threads into the plunger or follower 39 at its upper end and is adapted to receive the fitting 36 in a counter bore therein and clamp it in place between an internal shoulder 120 of the bushing 63 and a shoulder 121 on the plunger or follower 39. The upper face 122 of fitting 36 is concave and is adapted to coact with the lower convex face of body 3' of the isolation chamber 3 to provide a seal. Disposed within the lower end of the plunger or follower 39 is a compression spring 37 whose lower end engages the partition 64 in an intermediate portion of the flask holder 13 and the other end engages the upper wall of the chamber 65 that houses the spring 37. This tends to urge the fitting 36 of the follower into intimate contact with the lower face of the body 3' of the isolation chamber. The flask holder 13 is hollow and is comprised of two parts having screw threaded engagement at 66. The lower part of the flask holder is adapted to receive a flask 32 having a flange 67 on its upper intermediate portion for engagement with the flask holder or insert 68 to support it. The flask 32 shown in Figure 12 may be made of any desired material suitable for the purpose, such as glass, and has its upper end screw threaded for coaction with a plastic type of cap 69. The cap is internally screw-threaded to coact with the external screw threads on the upper end of the flask 32. It also has a central aperture 123 in its upper wall and is adapted to clamp a diaphragm, preferably of gum rubber or other suitable material sandwiched between the mouth of the flask 32 and the cap 69 to provide a seal for the mouth of the flask. This rubber sealing diaphragm 123 has the property that it may be easily punctured by a needle and will permit such needle to pass down through it. When the needle is withdrawn from the diaphragm the opening therein will close and seal itself. This permits it to make the flask air tight and impervious to liquids.

In operation, when fluid flows through the system of Figure 1 it enters the isolation chamber 3 through the port 71 and passes down through the outer annulus formed by the sleeve 29 and the inner walls of body 3'. It then passes up through the inner annulus between the sleeve 29 and the valve stem 21, and out through port 72. From there it is directed to the dump tank. The inner and outer annulae formed by the sleeve 29 serve to direct the flow of "soup" in a sweeping and self-cleaning operation. This will tend to eliminate the effect of memory from previous samples, and also permit the obtaining of a representative sample from any particular run. Port 73 of Figure 3, acts primarily in the capacity of a vent. Operation has indicated that venting restriction between the stop 25 and the convolutions of the bellows 19 and port 73 is negligible. It has also been found that the several small openings 30 in the sleeve 29 improve the flow pattern through the chamber.

In certain sampling procedures it is necessary that the trapped sample be held in the isolation chamber 3 for a specified period of time. This allows for decay of fisson products. During this period of decay the sample is maintained at slightly below the boiling point in order to decompose any hydrogen peroxide formed by the radiation decomposition of water. The coil 28 around the body 3' of the isolation chamber is thus used to maintain the desired temperature control of the entrapped fluid. This can readily be accomplished by either circulating steam, hot water, or coolant to adjust the temperature.

The receiver or sample flask 32 used in conjunction with the isolation chamber to receive the sample should be evacuated and sealed prior to mounting it in the sample holder 13. The diaphragm, previously described, serves to retain this vacuum pressure within the flask 32. The evacuation of the flask 32 prior to taking a sample, creates a pressure differential between it and the isolation chamber 3, and this tends to aid in the transfer of the sample from the isolation chamber to the flask.

The air cylinder 18 is employed to raise the sample flask 13 up to the isolation chamber 3. Its operation may be controlled by conventional manually operable valve means (not shown) that controls the flow of air to either side of the piston to actuate it in the cylinder. This movement of the flask holder 13 up to the isolation chamber causes the lower end of the body 3' to seat in the plunger or follower 39 of the flask and provide a seal. This seal is effected by providing a Teflon seat 122 or by utilizing other suitable sealant material in the flask holder. The effectiveness of the seal is determined by the compression of the spring 37 by the upward movement of the flask holder. The compression of the spring and the downward movement of the plunger, as the result of the action of the air cylinder 18, causes the end of the needle 135 to pierce the diaphragm 123 of the flask 32 so that liquid may be drained from the isolation chamber into the flask to provide the desired sample. The spring 37 moves the follower 39 up as the flask holder 13 is lowered and withdraws the needle 135 from the diaphragm 123, and simultaneously tends to wipe the tip of the needle 135 clean. Figure 3A therefore, illustrates the sample flask in position to receive a sample through the needle 135 from the isolation chamber 3.

The next step is to remove the sample flask holder 13 from the sampling point, to a position in alinement with the loading pipe where the sample in the flask 32 may be removed from the tank to the point where the analysis may take place. This is accomplished by manual operation of crank 15 in the manner heretofore described. When the sample flask holder 13 is brought into alinement with the loading pipe 14 and is locked in position by the pin 102 the air cylinder 18 is operated to act upon the lower end of the flask holder container 35 through the connection 39, 39' and raises the container 35 vertically until the flask holder 13 is projected up into the loading tube 14. As indicated in Figure 13 it will be noted that the lower end of the loading pipe 14 is externally threaded and is adapted to cooperate with the internal screw threads of a cap 70 which has an inturned flange 71 at its lower end and an upwardly extending cam 72 for engagement with the pivoted fingers 73 of a gripping tool.

The lifting tool is generally indicated as being comprised of a body of lead 74 encased in a metal housing 75 and having at its upper end 76 a coupling element 77 for cooperation with an upwardly extending rod for raising and lowering the tool. The lower end of the housing is generally indicated at 78 and comprises a base element having a plurality of radial grooves 79 which are adapted to receive and pivotally mount fingers 73 on pivots 80 as indicated in Figure 14. Base element 78 also has a plurality of bores 81 whose walls are internally screw threaded in their lower extremities to receive compression springs 82 and cooperate with screw threaded plugs 83 for maintaining the springs under compression. The upper ends of these springs are adapted to engage the inwardly extending leg portions of the pivoted elements 73. The inner surfaces of the fingers 73 are notched or shouldered at 84 to seat behind flange 85 on the flask holder 13 and yieldingly grip the flask for supporting and removing it.

Either before or after the flask holder 13 has been raised by air cylinder 18 into the lower end of the loading tube 14, the removing tool is inserted into the upper end of the loading tube and projected downwardly through the tube until the lower ends of the fingers 73 engage the inner surfaces of the cam 72 on the cap 70 and are forced apart, thereby permitting the shoulders 84, 84 on the fingers 73 to clear the flange or shoulder 85 on the flask holder 13. The air cylinder 18 then raises the flask holder to the desired position in the loading pipe or tube 14 and the tool is withdrawn so that fingers 73 rise along the inner surface of cam 72 until the shoulders 84, 84 of the fingers grip the flange 85 on the flask holder 13 and serve to raise the flask holder from its seat in the container 35 and remove it through the loading pipe 14 to a position where it may be inserted in a carrier and removed for analytical purposes.

When a new flask holder is inserted for obtaining a sample, it is merely pressed into the lower end of the tool until flange 85 is gripped by the shoulders 84 of spring fingers 73. The handling tool is then inserted in the loading pipe 14 and is permitted to descend until the flask holder 13 seats in the container 35. When this occurs the tool is pushed further down along the inner surfaces of the cam 72 of the cap 70 and the spring fingers 73 are spread apart, thereby releasing the flask holder 13. The air cylinder 18 is then operated to lower the container 35 and the flask holder 13 until it clears the fingers 73 of the tool. Thereafter the tool may be raised along the inner surface of the cam 72 and removed from the loading pipe. The sample is then obtained from the isolation chamber through the action of the transfer arm or frame 16 in the manner heretofore described.

The coupling of Figure 15, heretofore referred to is released by remote control. It is comprised of a smooth finished hemispherical head 124 on a male member 125 connected to a pipeline 126. The hemispherical head 124 on the male member 125 is adapted to engage and cooperate with a finished internal conical shaped seat 127 within a female member 128. The female member 128 is adapted to be joined through welding 129 or other appropriate means to tube 130 which is part of the permanent in place piping of the system. It will be apparent that small angular misalinement in initial positioning of these elements will not destroy the effectiveness of the seal at this joint. After alinement and positioning of the above elements, a backup rod 131 having a lower externally screw threaded surface is passed down through the plug 8 and is threaded into the upper screw threaded socket portion 132 of the female connector 128. As the rod 131 is threaded into the socket of the female member 128 the lower end 133 is brought into engagement with the top 134 of the male member 125 and forces it downwardly against the seat 127 to effect the seal between the conical surface of the seat and the hemispherical surface 124 of the male member. In order to facilitate coupling and uncoupling of the elements and to insure the easy separation of male member 125 from female member 128 an open ended longitudinal slot 135 is formed in the upper end of the socket of female member 128 to permit passage of the body of the male member 125. In uncoupling the elements, the backup rod 131 is simply screwed out of the threaded socket 132 and the male member 125 and its connecting line 26 are raised with the plug 8 until they are disengaged from the female member 128.

Those versed in the art will recognize that the advantages of the system described above are: (a) it provides a safe and relatively fool proof method of obtaining representative samples from a reactor by remote control where the reactor may contain a large quantitative inherently dangerous liquid; (b) although the system is particularly designed for the obtaining of samples of radioactive liquids contained at high pressure and elevated temperature, it will be evident that its use is not confined to such material; (c) the system does not require the use of bubblers, vacuum lifters or jet type aspirator for obtaining the samples; (d) the sampling facility, although not intended for this purpose can be used as an additional dump line in the event of an emergency, i.e., to rapidly drain the reactor fuel; (e) provision can be made to provide remote connections from the outside in case it is desired to make chemical additions into the circulating system when the reactor is not in operation; and (f) in case back flushing through the valve becomes necessary, it can be done with a minimum of alteration.

Having thus described our invention, we claim:

1. A sample system for radioactive liquids maintained under pressure comprising a shielded enclosure, a loading tube extending into the enclosure, an isolation chamber for receiving a predetermined sample of the liquid disposed within the enclosure, a sample holder, and means for alternately bringing the sample holder into registration with the isolation chamber and the loading tube to permit removal of samples from the enclosure.

2. A sampling system for radioactive liquids maintained under pressure comprising a shielded enclosure, a loading tube extending into the enclosure from an external point, an isolation chamber positioned for receiving a predetermined sample of liquid, a sample holder, a swinging frame for carrying the sample holder into registration with the isolation chamber and the loading tube to transfer samples, and means extending down through the loading tube for interlocking engagement with the sample holder to remove the sample from the enclosure.

3. A sampling system for radioactive liquids maintained under pressure comprising a shielded enclosure, a loading tube extending into the enclosure from an external point, an isolation chamber for receiving a predetermined sample of liquid, a sample holder, a swinging frame for carrying the sample holder into registration with the isolation chamber and the loading tube to transfer samples, and means extending down through the loading tube for removing the sample holder, and means carried by the frame for lifting the sample holder into interlocking engagement with the removing means.

4. A sampling system for radioactive liquids maintained under pressure comprising a shielded enclosure, a loading tube extending into the enclosure from an external point, an isolation chamber for receiving a predetermined sample of liquid, a line including a throttling valve for supplying liquid from a high pressure source, a sample holder, a remotely operated swinging frame for carrying the sample holder into registration with the isolation chamber and the loading tube to transfer samples, means extending down through the loading tube for removing the sample holder, and means carried by the frame for lifting the sample holder into interlocking engagement with the removing means.

References Cited in the file of this patent

UNITED STATES PATENTS

| | | |
|---|---|---|
| 1,101,568 | Roberts | June 30, 1914 |
| 1,166,520 | Henes | Jan. 4, 1916 |
| 2,476,249 | Payne | July 12, 1949 |
| 2,531,953 | Smith | Nov. 28, 1950 |
| 2,718,459 | Leverett et al. | Sept. 20, 1955 |